United States Patent [19]

Richardson et al.

[11] 3,997,452
[45] Dec. 14, 1976

[54] CRYSTAL MODIFIED DEPOSITION OF HYDRATED METAL OXIDE

[75] Inventors: Edwin A. Richardson, Houston; John A. Herce, Midland, both of Tex.

[73] Assignee: Shell Oil Company, Houston, Tex.

[22] Filed: May 5, 1975

[21] Appl. No.: 574,770

[52] U.S. Cl. .......................... 252/8.55 R; 166/274; 166/276; 166/294; 175/65; 252/8.5 A; 427/220

[51] Int. Cl.² ................ E21B 33/138; E21B 43/04

[58] Field of Search ............... 166/274, 294, 276; 175/65; 252/8.5 R, 8.5 A, 8.5 B, 8.5 C, 8.55 R; 427/215, 220

[56] References Cited
UNITED STATES PATENTS

| | | | |
|---|---|---|---|
| 2,450,936 | 10/1948 | Cardwell | 252/8.5 |
| 3,756,315 | 9/1973 | Suman et al. | 166/276 |
| 3,827,495 | 8/1974 | Reed | 166/294 X |

FOREIGN PATENTS OR APPLICATIONS

| | | | |
|---|---|---|---|
| 1,258,217 | 12/1971 | United Kingdom | 252/8.5 |
| 1,063,686 | 3/1967 | United Kingdom | 252/8.5 |

*Primary Examiner*—Herbert B. Guynn

[57] ABSTRACT

A treating liquid for depositing a coating of hydrated metal oxide on a remotely located material (such as a subterranean sand mass to be consolidated) is improved by a crystal modifier. The improved treating liquid comprises an aqueous alkaline solution of an amphoteric metal compound, a pH-reducing reactant, and a hydroxyorganic crystal modifier.

4 Claims, 4 Drawing Figures

CRYSTAL MODIFIED DEPOSITION OF HYDRATED METAL OXIDE

BACKGROUND OF THE INVENTION

This invention relates to an improvement in the hydrated metal oxide-depositing treating liquid described in the G. O. Suman, Jr., E. A. Richardson and R. F. Scheuerman U.S. Pat. No. 3,756,315.

SUMMARY OF THE INVENTION

The invention relates to making and using a treating liquid comprising an aqueous alkaline solution of an amphoteric metal compound and a pH-reducing reactant. The proportions of those components are adjusted relative to the location of a relatively remotely located material to be treated so that the solution is capable of remaining substantially homogeneous while it flows from its compounding location into contact with the material to be treated, and then relatively slowly deposits a relatively strongly adherent hydrated metal oxide coating on that material. In the present treating liquid, the components of the solution include a hydroxyorganic crystal modifier. The composition and concentration of the crystal modifier are adjusted so that its presence increases the layering of the precipitated hydrated metal oxide coating without unduly weakening the adherence of the coating.

DESCRIPTION OF THE INVENTION

Figure 1:
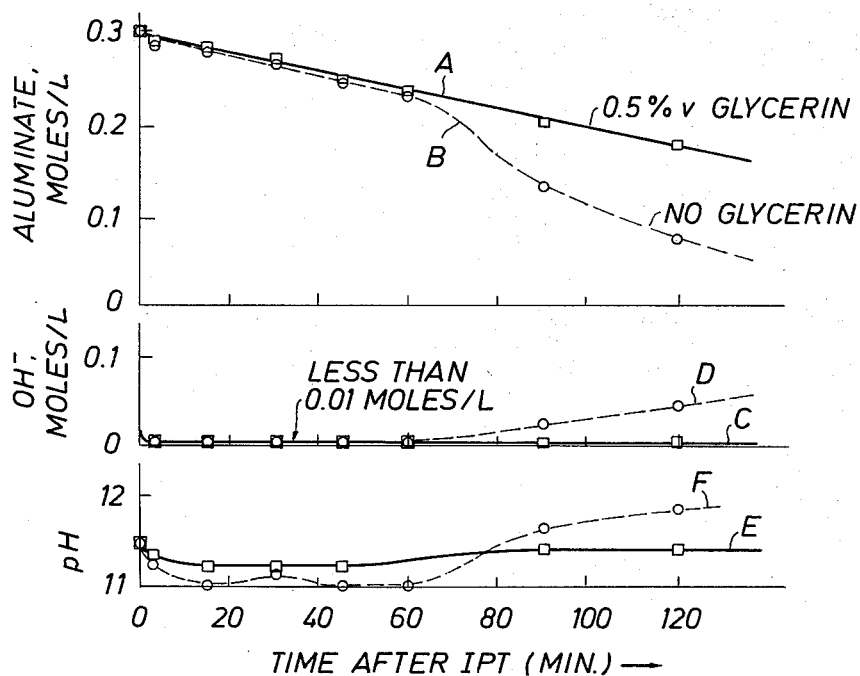
FIGS. 1 and 2 are plots of various effects of glycerine on depositions of hydrated aluminum oxides.

In general, the treating liquids of the present invention are relatively high pH (or alkaline) aqueous solutions of an amphoteric metal compound (such as an amphoteric metal oxide or a water-soluble hydroxy complex of the metal), one or more pH-reducing reactants, and one or more water-soluble hydroxyorganic crystal modifiers. Such treating liquids can also contain various types and proportions of other dissolved or suspended materials, as long as such other materials do not interfere with the subsequent pH-reactant and resultant precipitation hydrated metal oxide. The present treating liquids are typified by those in which the amphoteric metal compound is alkali metal aluminate. For convenience they will commonly be referred to as such "aluminate" solutions.

The present invention is, at least in part, premised on the following discovery. The treating liquids of U.S. Pat. No. 3,756,315 are generally effective for their indicated uses (e.g., in drilling, fracturing, perforating, oil displacing or the like types of fluids or well-treating operations, or in other operations such as forming corrosion resistant, or catalytic coatings of hydrated metal oxides). But, in some instances, the treating liquids of U.S. Pat. No. 3,756,315 tend to deposit undesirably large and randomly oriented crystals of the hydrated metal oxides. In view of this, tests were made of numerous types of crystal modifiers. It was discovered that hydroxyorganic crystal modifiers, such as the lignins, tannins and glycerols, are unobviously effective. In such a treating liquid, particularly where the pH-reducer is dimethyl formamide, the addition of glycerine tends to significantly inhibit the growth of needle-like crystals and provide uniform layered deposits of the hydrated aluminum oxide (gibbsite). In a sand consolidation process such a modification imparts greater strength without reducing permeability. In addition, in such a treating liquid, the glycerine also appears to prevent a subtle gibbsite-aluminate solution equilibrium shift which (in the absence of the glycerine), tends to unduly increase the hydroxide ion concentration and cause it to unduly accelerate the dimethyl formamide hydrolysis and the gibbsite deposition The concentration of the amphoteric metal compound in the present treating liquids can range from small but effective amounts such as 0.05 moles per liter of metal ion to substantially saturated solutions of the amphoteric metal compounds, substantially as described in U.S. Pat. No. 3,756,315.

The aqueous liquids in which the components of the present treating liquids are dissolved can be substantially any relatively soft water which is compatible with the solutes and the precipitation processes, substantially as described in U.S. Pat. No. 3,756,315.

The alkalinity of the present treating liquids can be provided by substantially any water-soluble inorganic or organic base or combination of bases capable of providing a pH at which the hydroxy complex of the amphoteric metal is soluble, substantially as described in U.S. Pat. No. 3,756,315.

The pH-reducing reactant used in the present treating liquids can be a compound or mixture of compounds that are soluble in the alkaline aqueous solutions and are capable of subsequently reducing their pH, substantially as described in U.S. Pat. No. 3,756,315.

The water-soluble hydroxyorganic crystal modifiers used in the present treating liquids can be substantially any such compounds which are soluble in the aqueous alkaline solution of amphoteric metal compound, and are compatible with the pH-reducing reaction and precipitation of hydrated metal oxide. Such compounds include glycerine, the water-soluble homologs of glycerol, polyglycerols, glycols, polyglycols, alkali metal tannates, sulfonated iron salts of hemlock bark extract such as Milflow (available from Milchem), quebracho, tannates such as the Magcobar Tannate (available from Magcobar Company), chrome-lingo-sulfonate materials such the Spersenes (available from Magcobar Company), and the like. Glycerine is particularly effective, and is generally typical of the behavior of such crystal modifiers. It is uniquely free of the variations in effectiveness or difficulties due to filtration problems, or the like, that may be encountered with the natural hydroxyorganic materials.

The concentrations and/or relative proportions of the components of the present treating liquids can be varied relatively widely in order to enhance selected functions or results, substantially as described in the 315 patent. The concentration of the amphoteric metal oxide can range from substantially trace amounts to substantially saturated solutions, with the lower concentrations being useful for depositing a thin coating and/or causing a relatively slow build-up of a thick coating as many pore volumes of treating liquid are flowed through or into contact with a material to be treated. The higher concentrations of the oxide deposit a thicker coating on surfaces contacted by less of the treating liquid. The concentration of the alkaline materials and the pH-reducing reactant are preferably correlated with the type and concentration of each other and with the type and concentration of the amphoteric metal oxide to provide a subsequent reduction of the pH to one that precipitates the hydrated metal oxide and a time-temperature exposure that is selected for (or is necessary with respect to) initiating the precipitation of the hydrated metal oxide. In general, for a given amphoteric metal oxide concentration and temperature exposure, the precipitation time can be delayed by increasing the concentration of the alkaline material (thus increasing the pH) and/or utilizing buffering materials and/or utilizing a pH reducing reactant material that reacts relatively slowly. The present treating liquids can be compounded substantially as described in U.S. Pat. No. 3,756,315; with the exception that an effective amount of crystal modifier is added. Such solutions can be used for substantially all of the purposes described in U.S. Pat. No. 3,756,315.

The composition and concentration of the crystal modifier should be correlated with the composition of the other components and the use to be made of the treating liquid, In general, the layering effect on the hydrated metal oxide-deposition increases with increases in the concentration of the crystal modifier. And, significant effects are provided by concentrations of from about 0.05 to 2.4 moles per liter (of the aqueous alkaline solution) of the effective component of the crystal modifier. Such concentrations are from about .03 to 15 percent by volume when the crystal modifier is glycerine. However, an increase in the concentration of crystal modifier is generally accompanied by a decrease in the strength of the adherence of the coating of the deposited hydrated metal oxide on the material being treated. Because of this, the concentration of the crystal modifier should be adjusted relative to the use intended. For example, in sand consolidating treatments in which the crystal modifier is glycerine and the pH-reducer is dimethyl formamide, the glycerine concentrations are preferably from about 0.1 to 1.5 percent by volume in order to provide compressive strengths of at least about 300 pounds per square inch (psi). Where the pH-reducer is formamide or urea (or others that are less apt to form crystals as large as those formed by dimethyl formamide) the crystal modifier concenration should be kept in the lower portion of the preferred range but its concentration should increase with decreases in the permeability of the mass of particles being consolidated.

Evaluation of Crystal Growth Modifiers

Table 1 shows the results of typical evaluations of crystal growth modifiers in comparable aqueous alkaline solutions of sodium aluminate, dimethyl formamide, and the indicated amounts of a crystal growth modifier.

TABLE 1

CRYSTAL GROWTH MODIFIERS EVALUATED

| MATERIAL | CONCENTRATION (lb/bbl) | EFFECTIVENESS[a] | REMARKS |
| --- | --- | --- | --- |
| Sodium Tannate | | V | Tannic acid neutralized with NaOH. Possible problem of precipitate formation at higher concentration. |
| Milchem Milflow | 0.5 – 6.0 | V | Sulfonated iron salt of hemlock bark extract |
| Baroid Quebracho | 0.5 – 6.0 | M+ | 90% quebracho tree extract |
| Magcobar Tannate | 0.5 – 1.0 | M+ | 90% quebracho |
| Magcobar Spersene | 0.5 – 1.0 | M | Chrome lignosulfonate |
| Magcobar MC Quebracho | 0.5 – 1.0 | M | 60% quebracho - 35% liqnite |
| Baroid Dessco | 0.5 – 1.0 | M | Iron/formaldehyde tannate |
| Lignite | 0.5 – 1.0 | M | |
| Sodium Borate | 0.5 – 2.0 | N | |
| Sodium Carbonate | 0.5 – 2.0 | N | |
| K Na Tartrate | 0.5 – 2.0 | N | |
| Sodium Citrate | 0.5 – 2.0 | N | |
| Urea | 5 M | N | |
| Sodium Chloride | 2, 3 M | N | |
| Alizarin | 0.2 – 0.5 | N | |
| Alizarin Red-S | 0.2 – 0.5 | N | |
| Calgon S-31 | 100 – 1000 ppm | N | An organic phosphonate |
| Calgon S-71 | 100 – 1000 ppm | N | An organic phosphonate |
| Visco 950 | 100 – 1000 ppm | N | An organic phosphonate |

[a]Effectiveness: V = very, M+ = intermediate to V and M, M = moderate, N = not effective.

Comparative Sand Pack Consolidation Tests

Table 2 lists the results of typical tests in which aqueous alkaline liquid solutions of sodium aluminate and dimethyl formamide (with and without crystal modifiers) were flowed through sand packs (approximately 119 centimeters in length and 1.44 inches in outer diameter) of a No. 5 Clemtex sand. The beneficial effects of the crystal modifier are particularly well shown by tests No. 4 and 5. These tests provided consolidated packs of comparable compressive strengths. Test 4, without the crystal modifier, caused an 80% reduction in permeability whereas Test 5, which contained one pound per barrel (ppb) of the crystal modifier, caused a permeability reduction of only 6%.

Effect of Glycerine on Aluminate Depletion

FIG. 1 shows the effect of glycerine in an 0.3 molar (M) aluminate solution. The solution contained 0.3M aluminate (moles per liter sodium aluminate), 0.6M dimethyl formamide, 0.11M hydroxide ion, 4% per weight sodium chloride, 2 milliliters per liter of solution of Versene-100. Curves A, C and E relate to such a system containing 0.5% by volume glycerine, and curves B, D and F relate to such a system with no glycerine. As shown by curves A and B, the aluminate depletion rate accelerates after about 25% of the aluminate has been deposited. Curves C and D show the variation with time in the concentration of hydroxide ion (which in both cases was initially 0.11 moles per liter). Curves E and F show the variation with time in the pH of the solution (both of which were initially 11.5). Electron photomicrographs of the gibbsite crystals deposited from these solutions at various times during the aluminate depletion indicated that the crystals tended to grow large during the accelerated depletion. It is apparent that the crystal modifier significantly reduced or eliminated the aluminate depletion-acceleration phenomena.

Figure 2:
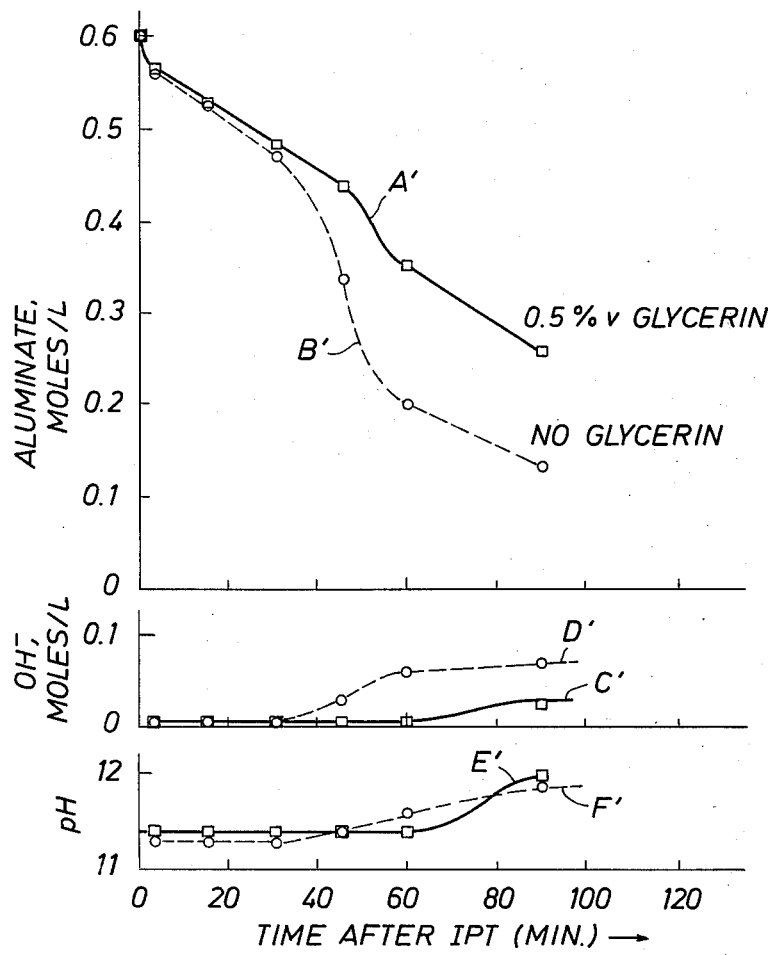

The data shown in FIG. 2 is substantially the same with respect to an 0.6M aluminate solution as is indicated by the curves A through F. It is apparent that the aluminate depletion-acceleration phenomena and its supression by the glycerine are analogous in the more concentrated solutions.

Effect of Glycerine Concentration on Compressive Strength

Figure 3:
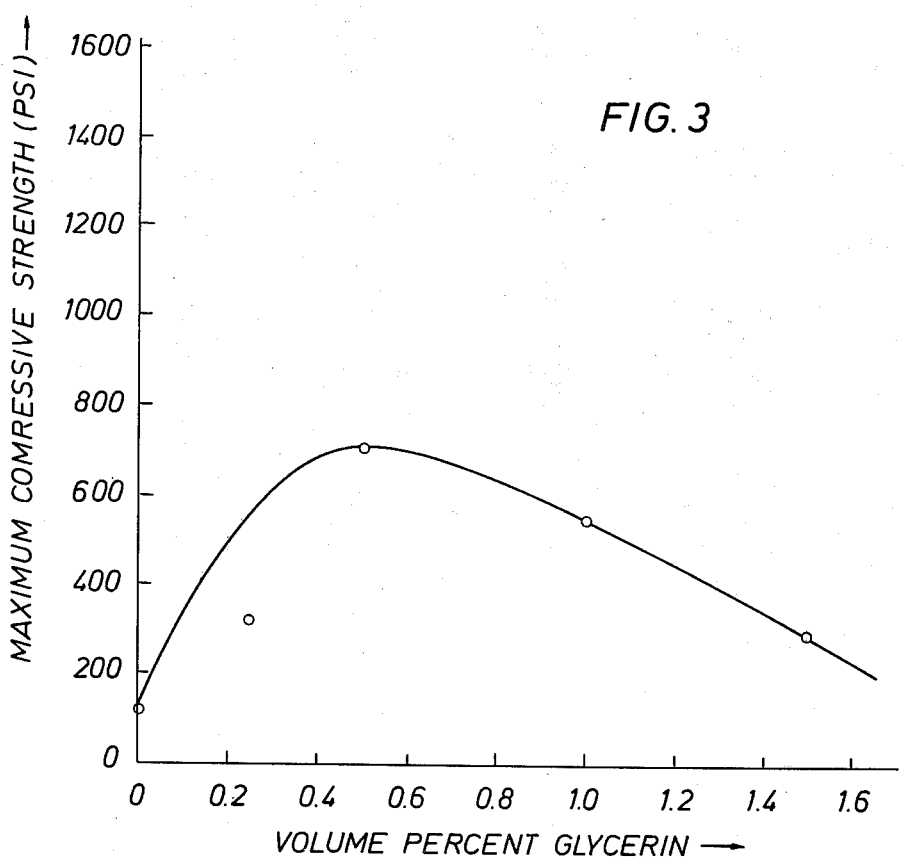
FIGS. 3 and 4 are plots of the effects of glycerine concentration on the compressive strengths of consolidated sands.
Figure 4:
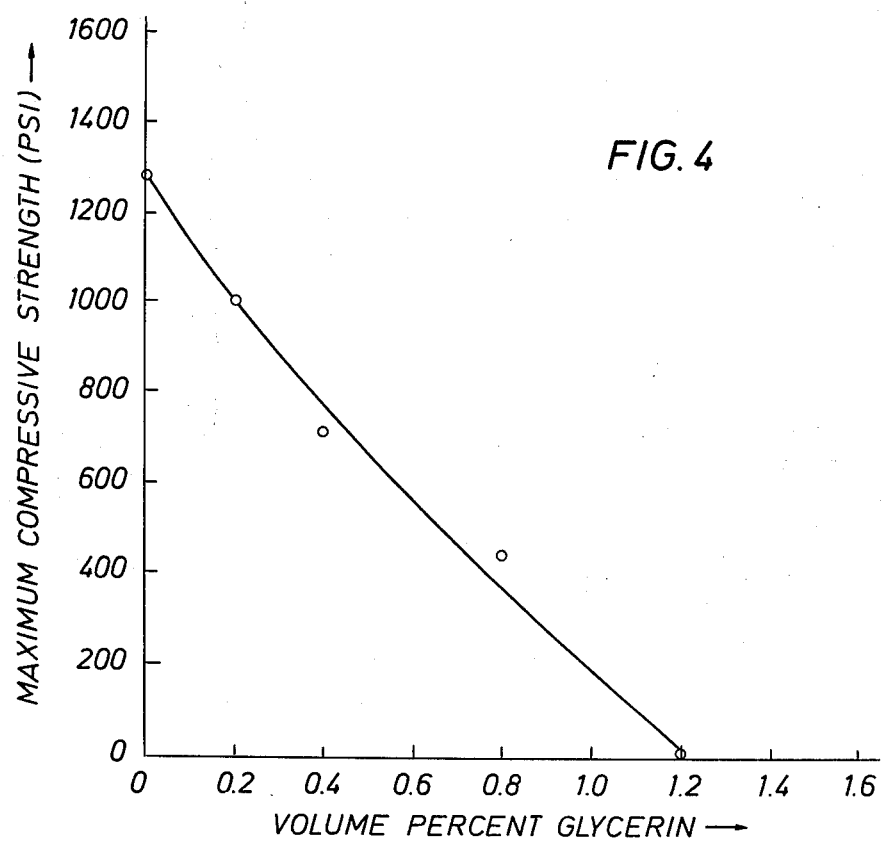

FIGS. 3 and 4 show variations in maximum compressive strengths with increases in glycerine concentration in consolidations of packs of No. 5 Clemtex sand. In FIG. 3 the consolidations were conducted at 140° F and the base-treating liquid was an aqueous alkaline solution of 0.6M aluminate, 0.8M dimethyl formamide. In FIG. 4 the consolidations were conducted at 100° F and the base-treating liquid was an aqueous alkaline solution of 0.6M aluminate, 0.8M formamide.

It will be apparent that in the dimethyl formamide system (of FIG. 3) glycerine concentrations up to about 0.5% resulted in increased compressive strengths and higher concentrations caused decreases in the strengths.

TABLE 2

| Test | Molar Concentration | | | Temp. (° F) | IPT[b] (min) | Flow Rate | | Time, (min)[c] | $k_f/k_i$[d] | No. PV[e] | Over Flush | Additives |
|---|---|---|---|---|---|---|---|---|---|---|---|---|
| | Aluminate | NaOH[a] | DMF | | | $V_p^{c)}$/min | cc/min | | | | | |
| 1 | 1.2 | 0.4 | 1.2 | 150 | 20 | — | 11 | 174 | 0.78[f] | — | None | None |
| 2 | 1.2 | 0.1 | 1.2[g] | 140 | — | 0.006 | 0.6 | 306 | 0.88 | 1.85 | Al Solution | None |
| 3 | 0.6 | 0.2 | 0.8 | 140 | 35 | 0.018 | 1.45 | 390 | 0.4 | 6.93 | None | None |
| 4 | 0.3 | 0.2 | 0.5 | 165 | 36 | 0.018 | 1.45 | 780 | 0.2 | 14.4 | None | None |
| 5 | 0.6 | 0.2 | 0.64 | 140 | 53 | 0.013 | 1.45 | 575 | 0.94 | 7.8 | Water | 1 ppb Spersene |
| 6 | 0.6 | 0.2 | 0.8 | 140 | 38 | — | 1.0 | ~1000 | 0.52 | 6.7 | None | 1 ppb Spersene |
| 7 | 1.2 | 0 | 1.4 | 110 | 25 | 0.011 | 2.25 | 260 | 0.62 | 2.93 | Water | 1 ppb Spersene |

[a]Added NaOH, does not include excess NaOH in aluminate.
[b]Not corrected for warm-up time.
[c]$V_p$/min = No. PV/treatment time, t; PV = pore volume of consolidated zone.
[d]$k_f$ = final treatment permeability at treatment time, t;k = initial brine permeability.
[e]No. of treatment pore volumes PV; PV = pore volume of consolidated zone.
[f]93.6 percent plugged after last PV depleted statically.
[g]4 moles/liter urea added.

This may be explainable as follows. The higher glycerine concentrations improve gibbsite crystal morphology by surpressing needle crystal growth, thus causing a more uniform distribution of well ordered deposits. However, when the glycerine concentration increases beyond an optimum concentration, the amount of glycerine absorbed becomes sufficient to keep the crystals from growing together at the grain contacts, thus decreasing the compressive strengths. Further, in the dimethyl formamide-containing system, at a glycerine concentration of about 2%, no compressive strength develops although the individual sand grains are uniformly covered with a good layered deposit.

It will be apparent that in the formamide-containing system (of FIG. 4) each increase in the glycerine concentration resulted in a decrease in the compressive strength. This implies that in consolidating a granular mass of a uniform high porosity (such as the Clemtex No. 5 sand packs), the amount of crystal modifier can advantageously be kept low, in order to enhance the compressive strength of the consolidated mass. However, since the permeabilities encountered in unconsolidated sand masses in and around the borehole of a well are seldom uniform, low permeabilities may be encountered. Comparable tests with sand packs having relatively low permeabilities of from about 500 – 1,000 millidarcies indicate that crystal modification is desirable in order to minimize the amounts by which the permeability is reduced.

What is claimed is:

1. In a process for coating a solid mass of particles in or around a subterranean portion of the borehole of a well with a relatively strongly adherent hydrated aluminum oxide coating by flowing an aqueous liquid solution of an alkali metal aluminate and a pH-reducing reactant of the group consisting of urea, formamide and dimethyl formamide capable of subsequently lowering the pH of the solution to one at which a hydrated aluminum oxide is precipitated after the solution has flowed into contact with the solid material so that the solid material is contacted by the solution while a hydrated aluminum oxide is being precipitated from the solution, the improvement which comprises:

including within the solution, before flowing it into said contact, an effective amount of from about 0.05 to 2.4 moles per liter of hydroxyorganic crystal modifier of the group consisting of lignins, tannins and glycerols having a concentration such that its presence increases the layering of the precipitated hydrated aluminum oxide coating without unduly weakening the adherene of the coating.

2. The process of claim 1 in which the hydroxy organic crystal modifier is glycerine.

3. The process of claim 2 in which the pH-reducing reactant is dimethyl formamide.

4. A treating liquid comprising an aqueous alkaline solution which:

contains an alkali metal aluminate and dimethyl formamide in proportions that first cause the solution to remain substantially homogeneous while flowing from a surface compounding location to a material treating location and then cause it to deposit an adherent coating of hydrated aluminum oxide; and contains glycerine in a proportion of from about 0.05 to 2.4 moles per liter effective for increasing the layering of the coating without unduly decreasing its adherence.

* * * * *